April 7, 1964 M. P. FINKEL 3,127,872
EXPERIMENTAL ANIMAL WATERING DEVICE
Filed May 24, 1963 2 Sheets-Sheet 1
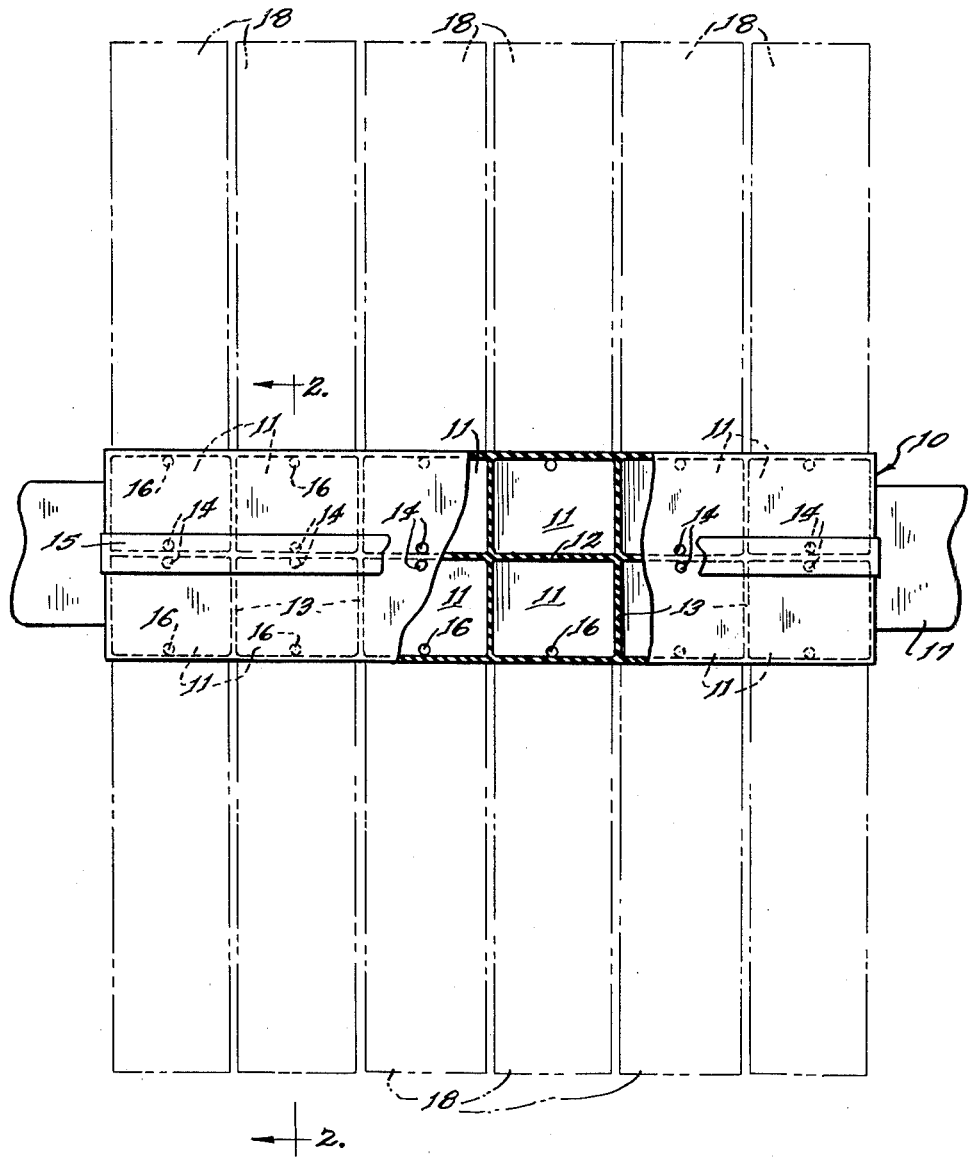
INVENTOR.
Miriam P. Finkel
BY Roland A. Anderson
Attorney

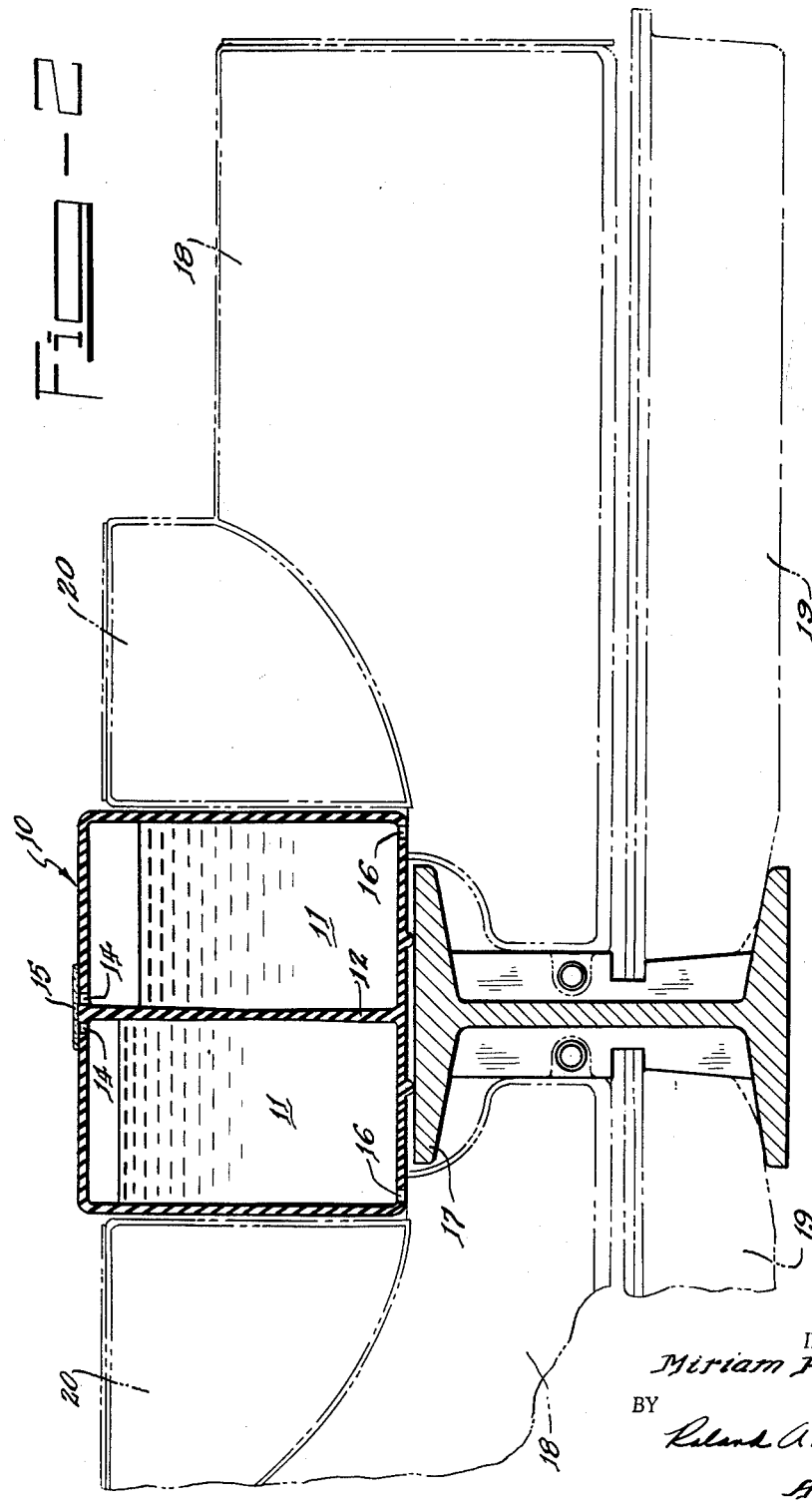

United States Patent Office 3,127,872
Patented Apr. 7, 1964

3,127,872
EXPERIMENTAL ANIMAL WATERING DEVICE
Miriam P. Finkel, Chicago, Ill., assignor to the United States of America as represented by the United States Atomic Energy Commission
Filed May 24, 1963, Ser. No. 283,127
2 Claims. (Cl. 119—72.5)

The invention relates to a novel device for watering experimental animals such as mice, rats, guinea pigs and the like, more particularly to a watering device for use with the type of experimental animal housing battery described in my United States Patent No. 3,074,375, issued on January 22, 1963.

Individual housing of experimental animals has many potential advantages, but it has not yet been adopted except in a limited way because of excessive labor costs. The task of filling feed hoppers and water bottles is now minimized by keeping ten or fifteen animals together in a cage, although this frequently leads to cannibalism, tail chewing, hair pulling, or simply general unrest within some cages, all of which adversely affect the results of experiments. All these matters are explained in detail in my patent above referred to.

My said Patent No. 3,074,375 proposes a scheme for housing experimental animals individually in batteries of individual enclosures, but the watering methods shown therein, while not altogether unsatisfactory, have not been found to be entirely reliable at all times. This is a serious drawback, not merely because the animals are harmed by lack of water, but because any interruption of the water supply, even though temporary, is apt to produce panic which can result in escape by the animals or even death if their efforts to escape are thwarted.

It is accordingly the general object to provide a device for watering experimental animals which will not involve excessive labor costs and yet be reliable and not subject to interruption.

It is a more particular object to provide a device for watering experimental animals which will be economical, reliable and suitable for use in a battery of individual animal enclosures.

Other objects will appear as the description proceeds.

The device of the invention is an elongated, compartmented waterer made of heat-resistant plastic material and having such dimensions that it will fit longitudinally into a battery of individual animal enclosures, each compartment having two holes, one of which is a filling hole near the top of the compartment and the other a drinking hole on, or adjacent, the bottom and exposed to an opening in one of the individual animal enclosures. The filling hole is covered gas-tightly, as by tape, when the device is in use, and the drinking hole has dimensions such that the animal may secure water by licking it, but otherwise the surface tension of the water remains sufficient to retain it within the compartment. This device is easy to fill and to sterilize, and since each animal has its own compartment, the spread of disease is inhibited.

Reference is now made to the drawings, FIG. 1 of which is a top view, partly broken away, of the watering device of the invention located within a battery, which is shown in phantom.

FIG. 2 is a sectional view drawn to an enlarged scale along the line 2—2 of FIG. 1.

The numeral 10 designates the watering device of the invention generally. It is of rectangular unitary shape and contains a number of individual compartments 11 which are also rectangular, of equal size and shape and fluid-tightly separated from each other by a longitudinal partition 12 and a plurality of transverse partitions 13. Partitions 12 and 13, as well as the exterior walls of the waterer, are made of heat-resistant plastic material capable of withstanding high temperature sterilization, such as autoclaving. In the preferred embodiment here shown the plastic is polypropylene, one-sixteenth of an inch thick.

Along the top of the watering device are two parallel rows of equally spaced filling holes 14, one entering each compartment. In the preferred embodiment shown here holes 14 are slightly offset on either side of the longitudinal partition 12. This arrangement makes it possible to seal filling holes 14 fluid-tightly with a single strip of tape 15, although, of course, other sealing arrangements could be used if for any reason it should be considered desirable to locate the filling holes elsewhere. Many kinds of tape could be used so long as they adhere to the plastic material of the watering device 10, but I have found that ordinary masking tape gives satisfactory results, and this is the tape used in the preferred embodiment here shown.

Along the bottom of the watering device 10 are two rows of equally spaced drinking holes 16, one entering each compartment. Drinking holes 16 are in the bottom itself adjacent the outer side walls of the watering device 10; this enables the animals to lick the drinking holes as will be explained in connection with FIG. 2. By making drinking holes 16 of the proper diameter and gas-tightly sealing the filling holes 14 the water will then be held by surface tension within the compartments 11 except when an animal licks the outer end of one of the drinking holes 16. The diameter of the drinking holes 16 will depend on their length, which, of course, depends on the thickness of the plastic; the longer the hole the greater the capillary force restraining exit of the water. The particular plastic is another factor to be taken into account since different plastics have different degrees of adhesion to water, and thus affect the permissible diameter of the drinking holes 16. In the preferred embodiment here shown the holes are one-eighth of an inch in diameter in polypropylene plastic one-sixteenth of an inch thick; these relative dimensions give good results, as established by tests with animals over a period of several months.

I also use filling holes 14 of the same diameter, one-eighth of an inch. This, however, is not a critical matter since the tape 15 will cover them in any event. For convenience in manufacture both sets of holes may be given a slightly inward taper; this enables studs in the forming die to be withdrawn easily.

No particular method of manufacture need be used to form the watering device 10. The bottom and side walls may be formed in one piece, and the partitions 12 and 13 and the top added later. However, it is contemplated that the most economical method will be to form the waterer in two halves, somewhat like the upper and lower halves of an egg crate, and then to join the edges of the two together. This is preferably done by bringing the edges into contact with a heated plate until they become soft, and then withdrawing the plate and compressing the edges together.

As shown in FIG. 2, the watering device 10 rests on an I-beam 17 which is the main support for a battery of individual animal enclosures 18. Under each enclosure 18 is a separate waste tray 19, and over each an elongated feed hopper 20. As can be seen in FIG. 2, each animal in an enclosure 18 has access to a drinking hole 16 between I-beam 17 and a feed hopper 20 since drinking holes 16 are adjacent the outer side walls of the watering device 10. The tests above mentioned have shown that experimental animals readily discover drinking holes 16 as a source of water and have no difficulty in utilizing them. No panic, or other indications of water deprivation, have ever been observed in animals housed in the manner described.

My watering device affords a great saving in the labor costs of watering animals. When the water supply gets low, which only happens in the average case once a week or so, the entire waterer 10 is removed from the I-beam 17 and another one which has previously been filled is immediately substituted. The first waterer is then removed to a location where drainage can be carried out after the tape 15 is removed. When all the compartments 11 have been drained the waterer 10 is then preferably put into an autoclave and sterilized. Following sterilization the waterer is filled simply by immersing it in water. Promptly thereafter a strip of tape 15 is placed over the rows of filling holes 14.

It will be understood that this invention is not to be limited to the details given herein, but that it may be modified within the scope of the appended claims.

The embodiments of the invention in which an exclusive property or privilege is claimed are defined as follows:

1. A watering device for experimental animals, comprising a rectangular plastic enclosure adapted to be inserted into a battery of experimental animal individual enclosures, the said rectangular plastic enclosure having a longitudinal partition midway along its entire length and depth and a plurality of equally spaced, parallel transverse partitions across its entire width and depth, whereby two parallel rows of fluid-tight rectangular compartments are formed of equal size and shape, two parallel rows of equally spaced filling holes offset a short distance on either side of said longitudinal partition, at least one of said filling holes entering each said compartment, a strip of tape gas-tightly sealing said rows of filling holes, and two parallel rows of equally spaced drinking holes, only one of said holes entering each compartment, along the bottom of said plastic enclosure, adjacent its side walls.

2. The device of claim 1 wherein the enclosure is made of polypropylene plastic about one-sixteenth of an inch thick, and the drinking holes are about one-eighth of an inch in diameter.

References Cited in the file of this patent

UNITED STATES PATENTS

| | | |
|---|---|---|
| 2,324,020 | Pinson | July 13, 1943 |
| 2,946,308 | Harris | July 26, 1960 |
| 3,042,002 | Liell | July 3, 1962 |